UNITED STATES PATENT OFFICE.

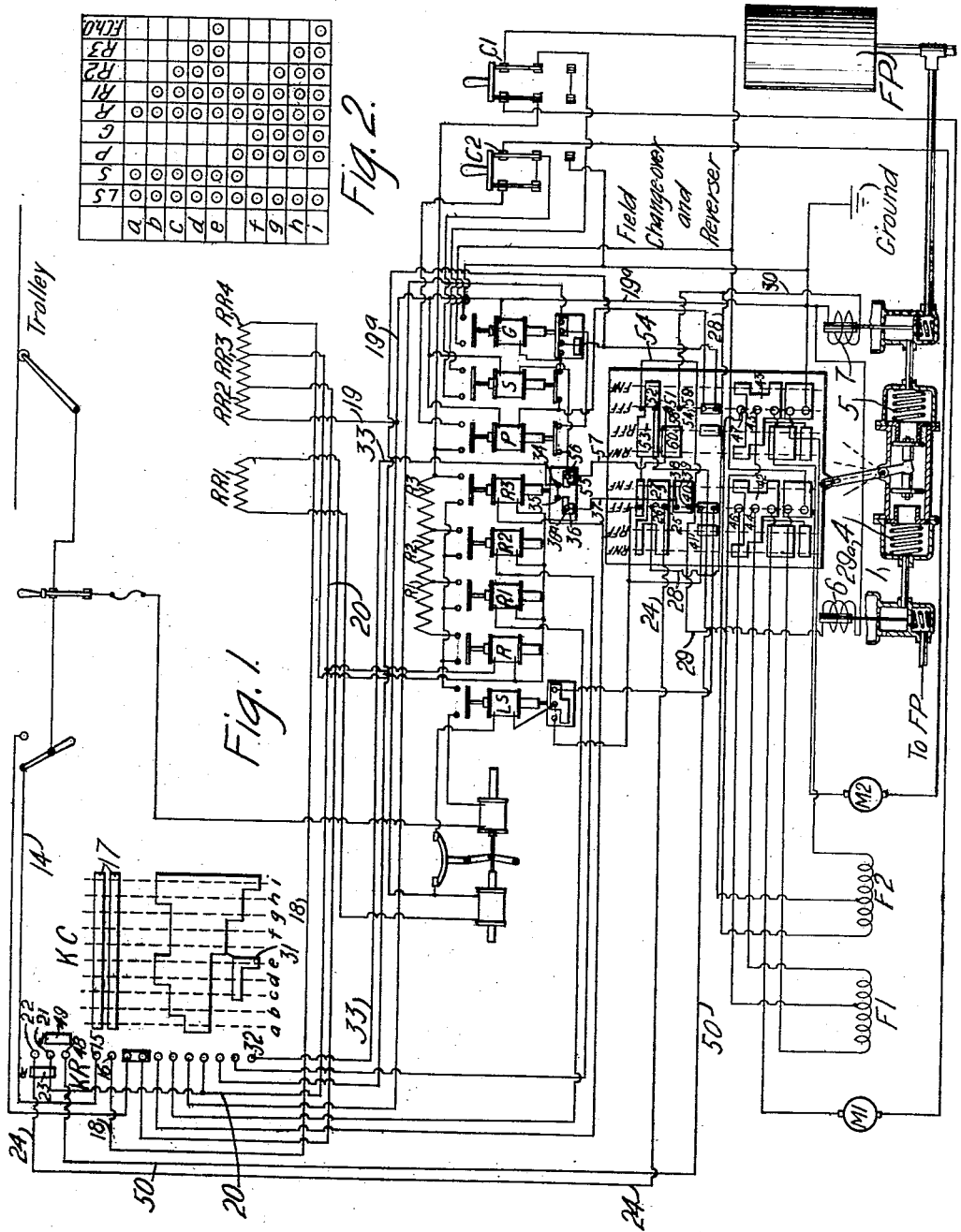

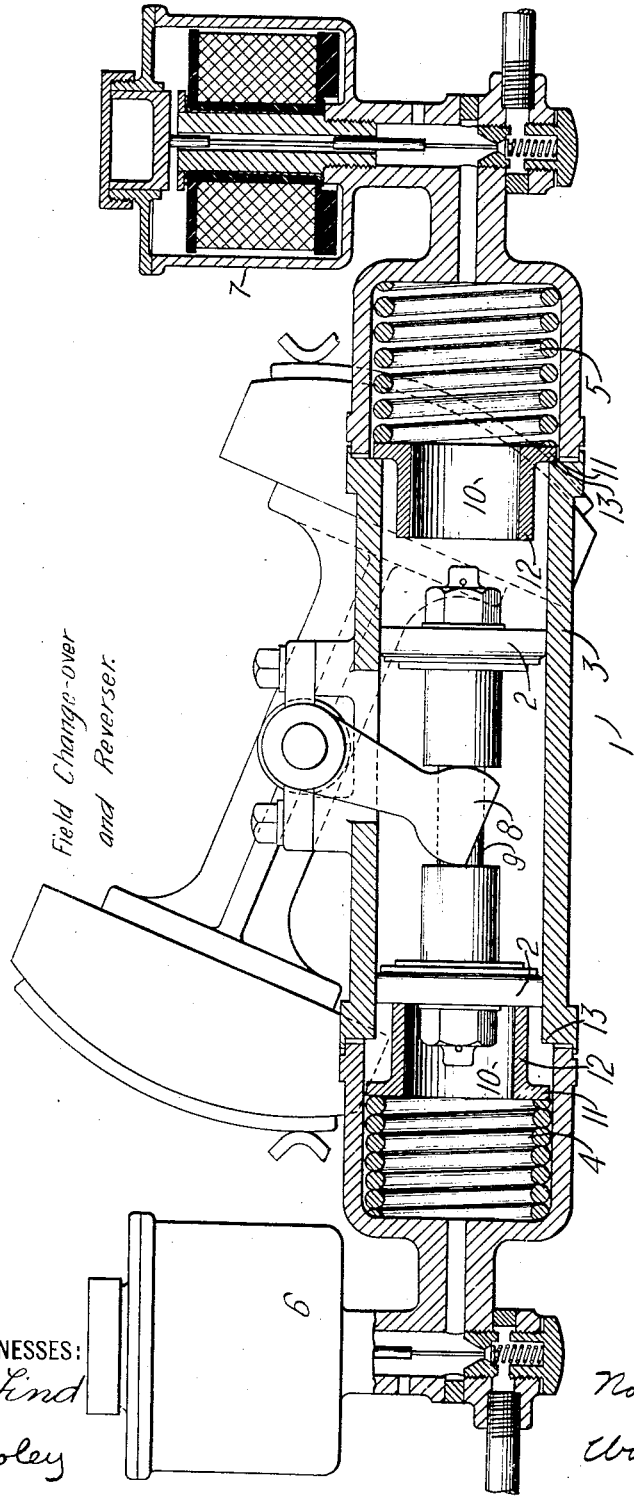

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,157,820.

Specification of Letters Patent.

Patented Oct. 26, 1915.

Application filed December 4, 1913. Serial No. 804,629.

*To all whom it may concern:*

Be it known that I, NORMAN W. STORER, a citizen of the United States, and a resident of Pittsburgh, in the county of Allegheny and State of Pennsylvania, have invented a new and useful Improvement in Systems of Control, of which the following is a specification.

My invention relates to systems of control for electric motors, and it has special reference to a combination of certain hitherto separately operated members in one piece of control apparatus and to means for actuating the same.

One object of my invention is to provide a control system embodying means of the above-indicated character, whereby the cost of construction and installation and the number of control apparatus members are reduced, and the operation of the system is rendered more economical and convenient than heretofore.

Another object of my invention is to provide an improved device for electro-pneumatically controlling the operation of a certain piece of control apparatus, as hereinafter described.

Heretofore, the switching devices known in the art as the "reverser" and the "field change-over switch" have commonly been constructed as separate members. As the respective names imply, the "reverser" is employed to reverse the connections of either the motor armature or field winding, usually the latter; and the "field change-over switch" is utilized to change from "full field" to "normal field" connections, and vice versa, for a well-known purpose. In consequence, field connections have been brought through both devices and an unnecessary complication of circuits has been entailed.

According to my invention, I provide a single structure embodying switching means respectively having the functions of the reverser and the field change-over switch and likewise being provided with other conducting means, whereby the circuit connections of the system are simplified, and operation of the system becomes easier and less expensive. The combined structure is adapted to assume two positions in each of the forward running and reverse running directions. The first step in either direction serves to direct connect or reverse the field winding connections of the machine or machines, and the second step serves to eliminate a portion of the field winding or windings.

I also provide an improved electrically-controlled pneumatically-operated mechanism for actuating the combined structure outlined above, comprising a reciprocating piston which acts in opposition to a spring in the second step in either direction, whereby the structure is automatically returned to its initial or "full field" position, upon release of the operating force.

In the accompanying drawings, Figure 1 is a diagrammatic view of a control system embodying my invention, the pneumatically-operated actuator being shown, for the most part, in section; Fig. 2 is a chart of well-known form, showing the sequence of operation of switches; and Fig. 3 is a view, chiefly in section but partially in elevation, of the actuator shown in Fig. 1.

Referring to Fig. 1 of the drawings, the system here shown comprises a supply-circuit conductor which, for convenience, is marked "Trolley;" a pair of electric motors having armatures marked, respectively, $M^1$ and $M^2$ and field magnet windings marked, respectively, $F^1$ and $F^2$, a plurality of main-circuit resistor sections, one of which may be short-circuited by a switch $R^2$, and all three of which may be short-circuited by a switch $R^3$; a pair of cut-out switches $C^1$ and $C^2$ respectively associated with the motors having the armatures $M^1$ and $M^2$, a plurality of control switches LS, R, P, S and G, of a familiar type, for effecting the desired circuit changes; a master controller KC and a master reverser KR for energizing the control switches variably through control resistor sections $RR^1$, $RR^2$, $RR^3$, and $RR^4$, and adapted to assume a plurality of motor-accelerating positions $a$ to $i$ inclusive; a main-circuit and control-circuit apparatus marked "Field change-over and reverser" and having the combined functions implied by the name; an electrically controlled, pneumatically-operated actuator 1 for the apparatus just referred to; and a suitable source FP of fluid pressure for the actuator.

The general construction of the combined "field change-over and reverser" is similar to that of the familiar controller drums, as will be understood. The apparatus is adapted to assume two operative positions in either direction from an imaginary "off" position, the first position in one direction corresponding to the "forward" running position and the first position in the opposite direction corresponding to the "reverse" running position, the second position in either case serving to change from "full field" to "normal field" connections of the motors, for a purpose well-known in the art. It will be understood that, whereas the field change-over and reverser combination is shown, for convenience, developed into a single plane in Fig. 1, the construction is actually of the drum type, as shown in end elevation in Fig. 3. According to Fig. 1, the upper half of the field change-over and reverser combination carries control contact members for suitably energizing the magnet coils of the actuator 1 and for arranging other control circuit connections; whereas the lower half carries main circuit contact members for changing over and reversing the field connections of the motors. It will be understood, however, that I do not restrict myself to any particular arrangement of parts.

The actuator 1, best shown in Fig. 3, comprises a double-acting duplex piston 2, a suitable cylinder or casing 3 therefor, a pair of preferably helical springs 4 and 5 respectively disposed in the ends of the cylinder 3, for a purpose hereinafter specified, a pair of magnet valves 6 and 7 of familiar or any suitable construction which are respectively adapted, when energized, to admit fluid pressure from any suitable source to the corresponding end of the cylinder 3, and an oscillating link 8 operatively associated with the piston 2 and rigidly secured to the shaft of the field change-over and reverser combination, whereby rotative movement of the latter is effected. The arrangement of parts is such that the piston 2 is substantially dependent upon fluid pressure only for actuation to the first position of the reverser, in either direction, and acts against the corresponding spring 4 or 5 when moved to either second position. Upon release of the fluid pressure, the reverser is, therefore, adapted to automatically return to the corresponding first position. The duplex piston 2 may be of any suitable construction and preferably has the link 8 oscillatably mounted on an intermediate piston-rod 9.

In order to prevent undue interference of either spring 4 or spring 5 with the substantially free movement of the piston 2 to the corresponding first position, a suitable collar or harness 10 is provided in connection with each spring. The harness preferably has an outwardly-extending flange 11 on one end to provide a suitable bearing surface for the adjacent spring, and the barrel 12 of the harness is of a diameter sufficiently small to readily enter the cylinder 3. The inner face of the flange 11 is adapted to engage an internal shoulder 13 of the cylinder 3 at a predetermined point, whereby undesirable further movement of the associated spring is prevented.

Assuming the actuator to be in the "forward" running position, as shown in the drawing, if the coil of valve 6 or that of valve 7 is energized, as hereinafter described, fluid, under pressure, is admitted to the cylinder 3 from the source FP to actuate the piston 2 to either the corresponding first or second position, according to the period of energization of the coil in question. If actuated to the first position, the piston 2 engages the barrel 12 of the harness 10 just prior to finishing the stroke, the associated spring thereby acting as a buffer to properly and expeditiously position the piston 2. If actuated to the second or field changeover position, the piston 2 continues to engage the barrel 12 and, consequently, the adjacent spring is highly compressed. When the fluid under pressure is released, the piston 2 and the associated reverser are automatically returned to the adjacent first position, by reason of the resilient action of the spring 5, which is limited in its expansive movement by the harness 10, as hereinbefore described.

In order to avoid confusion, each resistor section will hereinafter be designated by the reference character which is applied to its short-circuiting switch, for example; the resistor short-circuited by the switch $R^1$ will be termed the $R^1$ resistor.

It will be understood that the application of my invention is not limited to the particular and well-known system of control shown and, consequently, only so much of the system will be described as is necessary to a clear understanding of the arrangement and operation of the "field change-over and reverser" and its actuator 1.

Assuming that the apparatus embodied in the control system occupies the positions shown in the drawing, the operation of the system, so far as it appertains to my invention, is as follows: If the master reverser KR is moved to the reverse position, a control circuit is established from the "trolley", through a conductor 14, control fingers 15 and 16—which are bridged by a contact segment 17—a conductor 18, resistors $RR^4$, $RR^3$, $RR^2$, and conductors 19 and $19^a$ to "ground." A branch circuit is established through a conductor 20, which extends from a point intermediate the resistors $RR^2$ and $RR^3$, through control fingers 21 and 22—which are bridged by a contact member 23 of the master reverser KR—a conductor 24, control fingers 25 and 26—which are bridged by a contact member 27 of the field change-over and reverser—conductors 28 and 30, and the coil 7, to "ground", thus energizing the reversing coil of the reverser, which is thereupon actuated to its reverse running position, designated as "RFF", by the actuator 1, the control circuit being broken at the contact member 27. To throw the field change-over and reverser combination from the reverse to the forward position, the master reverser KR is moved to its forward position, whereupon a circuit is established from contact fingers 21 and 48 which are bridged by a contact member 49 of the master reverser through a conductor 50, control fingers 51 and 52 which are bridged by a contact member 53 of the reverser conductors 54 and 29, the coil 6, and conductor 29$^a$ to "ground", thus energizing the "forward" coil of the reverser, which thereupon assumes its forward running position, designated as "FFF", the control circuit being broken at the contact member 53. If the master controller KC is successively moved to its positions $a$ to $d$, inclusive, the motors are first disposed across the line with full field connections and in series with the resistors $R^1$, $R^2$, and $R^3$, which are then successively short-circuited by the corresponding switches, thereby leaving the motors in straight series relation. This method of operation is familiar and is indicated by the chart of Fig. 2. No further description, therefore, is believed to be necessary here. In position $e$, an energized contact segment 31 of the master controller engages a control finger 32, whence circuit is completed through a conductor 33, contact buttons 34 and 35, a contact member 36 that is attached to the switch $R^3$ to make contact with the button 35 when the switch occupies its "in" position, a contact finger 36$^a$, a conductor 37, control fingers 38 and 39—that are bridged by a contact segment 40 of the reverser—and conductors 41 and 29, to the coil 6. The field change-over and reverser combination is thus moved to the second or field-changing position, designated as "FNF", against the compression of the spring 5, as hereinbefore explained. The contact segment 40 is of sufficient length to remain in circuit after the movement of the reverser, this precaution being necessary, since, upon the deënergization of the coil 6, the reverser is moved back to the first position by the spring pressure, as already described. Such deënergization takes place, for instance, when the master controller is moved out of position $e$. When the reverser is moved to its second position, by reason of the peculiar shape of the main circuit contact members 42 and 43, contact is broken with control fingers 44 and 45, and circuit is made with control fingers 46 and 47, respectively. Fingers 44 and 45 are respectively connected to one end of the field windings $F^1$ and $F^2$; and the fingers 46 and 47 to intermediate points of the respective windings and, therefore, the "full field" connections of the motors are severally changed to the "normal field" connections, and a higher speed is obtained, as will be readily understood by those skilled in the art. In positions $f$, $g$ and $h$ of the master controller, the motors are restored to the "full field" connections, and are connected in parallel relation, resistors $R^2$ and $R^3$ being disposed in series with the combination. The resistors are then successively excluded. In position $i$, the motor connections are changed to "normal field", in a manner already explained with reference to position $e$.

The field change-over and reverser combination may be thrown from its reversed position to the corresponding second position, designated as "RNF", against the action of the spring 4, provided the switch $R^3$ is in its closed position, in a manner similar to that described in connection with actuation of the reverser to the position denoted as "FNF" from the position referred to as "FFF". In this case, a circuit is established from the energized contact button 34, through a contact member 55 that is attached to the switch $R^3$, a contact finger 56, conductor 57, control fingers 58 and 59—which are bridged by a contact member 60 of the reverser—conductors 61 and 30 and coil 7 to "ground." It will be understood that the actuation of the field change-over and reverser combination from the normal forward to the normal reverse position, or vice versa, reverses the connections of the field windings $F^1$ and $F^2$ through the medium of certain of the contact members located upon the lower end of the combined apparatus and the corresponding control fingers, in a well known manner; and, consequently, it has not been deemed necessary to describe such changes in detail.

I wish it to be understood that I do not consider my invention as restricted to the particular circuit connections and structural details herein set forth, but desire that only such limitations shall be imposed as are indicated in the appended claims.

I claim as my invention:

1. The combination with a movable member, of an actuating means comprising a pair of pistons operatively connected to said member, cylinders in which the pistons operate, plural means for independently controlling the fluid pressure in each of the cylinders to produce a movement of the pistons in either the one or the other direction, means for automatically biasing said pistons and movable member to a predetermined position upon the release of the corresponding pressure, and means operatively connected to said movable member for electromagnetically governing the controlling means.

2. The combination with a movable member, of an actuating means comprising a pair of pistons operatively connected to said member, cylinders in which the pistons operate, plural means respectively located near the outer ends of the cylinders for independently increasing the fluid pressure in each of the cylinders to produce a movement of the pistons in either the one or the other direction, automatic means dependent upon the actuated member for governing the pressure-changing means, and resilient means for automatically biasing said pistons and movable member to a predetermined position upon the resumption of normal pressure in the corresponding cylinder.

3. The combination with a movable member and an electric switching device having relatively movable contact members one of which is operatively connected to said member, of an actuator comprising a piston, a supply of fluid pressure, a pair of valves respectively located on opposite sides of the piston and controlled by the switching device for independently governing the admission of fluid pressure to the one or the other side of said piston, and spring means for automatically biasing said piston and said movable member to a predetermined position upon the resumption of normal pressure on the corresponding side of said piston.

4. The combination with a movable member adapted to assume a plurality of operative positions in each of a plurality of directions, of an actuating means comprising a piston operatively connected to said member, means for admitting fluid pressure to opposite sides of said piston, and means for biasing said piston and movable member to the first position from other positions upon the release of the corresponding pressure.

5. The combination with a movable member adapted to assume a plurality of operative positions in either a forward or a reverse direction, of an actuating means comprising a pair of pistons operatively connected to said member, cylinders in which the pistons operate, means for controlling the fluid pressure in each of the cylinders to produce a movement of the pistons in either the one or the other direction, electrical means operatively connected to said movable member for governing the controlling means, and resilient means for returning said pistons and movable member to the first position from subsequent positions upon the release of the corresponding pressure.

6. The combination with a movable member adapted to assume two operative positions in either a forward or a reverse direction, of an actuating means comprising a pair of pistons operatively connected to said member, cylinders in which the pistons operate, means for increasing the fluid pressure in each of the cylinders to produce a movement of the pistons in either the one or the other direction, automatic means dependent upon the actuated member for governing the pressure-changing means, and plural spring means for severally engaging said pistons during predetermined movement from any first position to cause a return thereto upon the resumption of normal pressure in the corresponding cylinder.

7. The combination with a switching device having a movable member adapted to assume two operative positions in either a forward or a reverse position, of an actuator comprising a pair of pistons operatively connected to said member, cylinders in which the pistons operate, a supply of fluid pressure, valves controlled by the switching device for governing the admission of fluid pressure to the one or the other free sides of said pair of pistons, a plurality of springs severally disposed in the outer ends of said cylinders, and a plurality of harnesses adapted to engage said springs and to be engaged by said pistons during movement into any first position and therefrom to a subsequent position, whereby said pistons and movable member are returned to the respective first position upon the resumption of normal pressure on the corresponding side of said pistons.

8. The combination with a movable member adapted to assume two operative positions in either a forward or a reverse position, of an actuating means comprising a piston operatively connected to said member, a cylinder for said piston provided with internal shoulders near its ends, means for admitting fluid pressure on opposite sides of said piston to produce a movement thereof in the one or the other direction, automatic electrical means dependent upon the actuated member for governing the pressure-changing means, a plurality of springs severally disposed in the outer ends of said cylinder, and a plurality of harnesses severally having a flange adapted to temporarily engage said shoulders to restrain said springs and having a barrel adapted to be engaged by said piston during movement into either initial position.

9. A controller for electric motors comprising a multi-position control drum having main circuit contact members, a movable operating member attached to said drum, a cylinder, a supply of fluid pressure, a piston operating within the cylinder, electromagentically-actuated valves for controlling the supply of fluid pressure to opposite ends of the cylinder, the valve-actuating magnets being governed by connections on the drum, and resilient means tending to maintain said piston and drum in an initial position.

10. A controller for electric motors comprising a control drum provided with main and auxiliary circuit contact members and adapted to assume a plurality of positions in either a forward or a reverse direction, a movable operating member for said drum, a cylinder, a supply of fluid pressure, a piston operating within the cylinder, electromagnetically-actuated valves for controlling the supply of fluid pressure to opposite ends of the cylinder, the valve-actuating magnets being governed by certain of said auxiliary contact members, and plural spring means disposed in the opposite ends of the cylinder to respectively engage said piston during movement from either the initial forward or the reverse position to a corresponding subsequent position.

11. The combination with an electric motor, of a controller therefor comprising a single switching device having initial positions, and provided with circuit connections for forward and reverse running, respectively, of the motor, and having corresponding subsequent positions, and provided with circuit connections for changing the motor field strength, and electromagnetic means for controlling the operation of said device.

12. The combination with an electric motor, of a controller therefor comprising a single switching device adapted to assume a plurality of positions in either a forward or a reverse direction, the initial positions corresponding to forward and reverse running, respectively, and the subsequent positions being also adapted to change the amount of the motor field winding in circuit, and controllable electro-mechanical means for operating said device.

13. The combination with an electric motor, of a controller therefor comprising a single switching device having circuit connections for reversing the motor and for independently changing the field strength thereof, and an actuating means for said device comprising a movable member attached thereto, a piston operatively connected to said member, means for admitting fluid pressure to opposite sides of said piston, and electrical means for controlling the pressure admission.

14. The combination with an electric motor, of a controller therefor comprising a single switching device having circuit connections for reversing the motor and for independently changing the field strength thereof, and an actuating means for said device comprising a movable member attached thereto, a piston operatively connected to said member, a cylinder in which the piston operates, means for admitting fluid pressure to opposite ends of said cylinder, electromagnetic means dependent upon the actuated device for governing the pressure-admitting means, and means for biasing said piston and device to the "full field" position upon the release of the corresponding pressure.

15. The combination with an electric motor, of a controller therefor comprising a single switching device adapted to assume a plurality of positions in either a forward or a reverse direction, the intitial positions corresponding to forward and reverse running, respectively, and the subsequent positions being also adapted to change the amount of the motor field winding in circuit, and an actuator comprising a movable member attached to said device, a piston operatively connected to said movable member, a cylinder in which the piston operates, means for admitting fluid pressure on opposite sides of said piston to produce a movement thereof in the one or the other direction, automatic electrical means dependent upon the actuated member for governing the pressure-admitting means, a plurality of springs severally disposed in the outer ends of said cylinder, and a plurality of harnesses for positioning said springs and adapted to be respectively engaged by said piston during movement into the corresponding first position and therefrom to a subsequent position.

16. In a control system, the combination with an electric motor, an accelerating resistor, a plurality of motor-control switches, and a master switch, of a switching device having circuit connections for reversing the motor and for independently changing the field strength thereof, and an electromagnetically controlled actuating means for the device.

17. In a control system, the combination with an electric motor, an accelerating resistor, a plurality of motor-control switches, and a master switch, of a switching device having circuit connections for reversing the motor and for independently changing the field strength thereof, and an actuator for the device comprising a cylinder, a piston operatively connected to said device, a supply of fluid pressure, means dependent upon the master switch for governing the supply of fluid pressure to the cylinder ends, and means for biasing said piston and said device to the "full field" position upon the release of the corresponding pressure.

18. In a control system, the combination with an electric motor, an accelerating resistor, a plurality of motor control switches, and a master switch, of a single switching device provided with main and auxiliary circuit contact members and adapted to assume a plurality of positions in either a forward or a reverse direction, the initial positions corresponding to forward and reverse running, respectively, and the subsequent positions being also adapted to change the amounts of the motor field winding in circuit, and an actuator comprising a movable member attached to said device, a piston operatively connected to said movable member, a cylinder in which the piston operates, means for admitting fluid pressure on opposite sides of said piston to produce a movement thereof in the one or the other direction, electrical means for controlling said fluid pressure and governed through said master switch by certain of said auxiliary contact members and by the closing of one of said control switches, a plurality of springs severally disposed in the outer ends of said cylinder, and a plurality of harnesses for positioning said springs and adapted to be respectively engaged by said piston during movement into the corresponding first position and therefrom to a subsequent position.

In testimony whereof, I have hereunto subscribed my name this 29th day of Nov., 1913.

NORMAN W. STORER.

Witnesses:
 JACOB STAIR, Jr.,
 B. B. HINES.